Sept. 20, 1949.  O. V. MALMQUIST  2,482,193
CAM OPERATED PLIERS
Filed Nov. 25, 1946
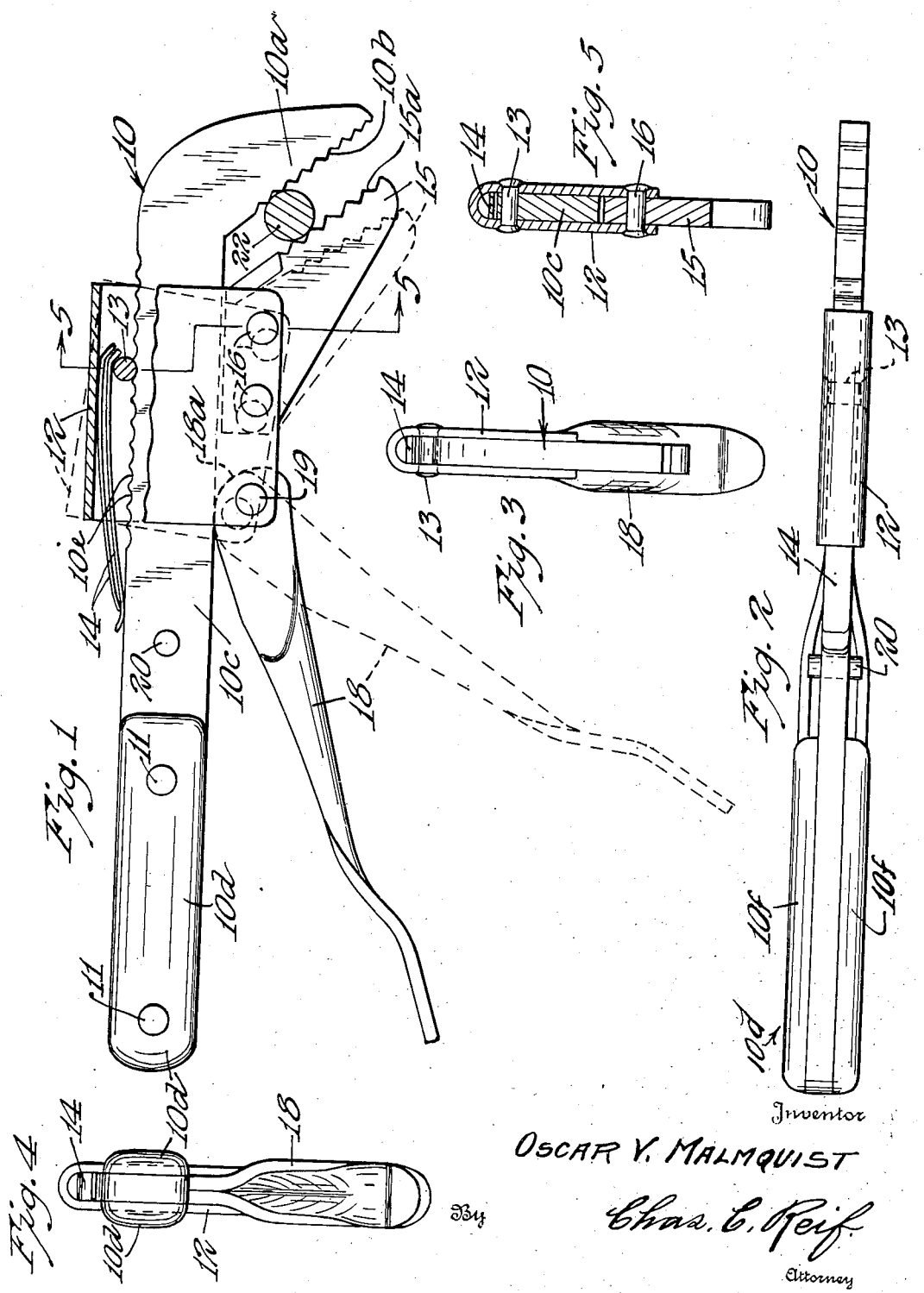
Inventor
OSCAR V. MALMQUIST
By Chas. E. Reif
Attorney Patented Sept. 20, 1949

2,482,193

UNITED STATES PATENT OFFICE 2,482,193

CAM OPERATED PLIERS

Oscar V. Malmquist, Minneapolis, Minn.

Application November 25, 1946, Serial No. 712,113

2 Claims. (Cl. 81—78)

This invention relates to pliers and particularly to pliers having jaws which are cam operated.

It is desirable in a pair of pliers to have jaws which will grip an object with considerable force so that the object cannot turn in said jaws. This usually requires more pressure than can be obtained in pliers which merely have two members pivoted together with jaws at one side of their pivotal connection.

It is an object of this invention to provide pliers having opposing jaws which can be relatively moved to engage an object and having cam means operated by moving the handles of said pliers together to cause one of said jaws to move toward the other with great force.

It is a further object of the invention to provide pliers comprising a member having a fixed jaw at one end, a shank extending from said jaw and a handle connected to said shank, a member movable longitudinally of said shank, a second jaw rigidly secured to said second member and adapted to cooperate with said fixed jaw in gripping an object, said second member being oscillatable on said shank and a handle pivoted to said second member having a cam portion arranged to engage said shank whereby when said handles are moved together said second member will be oscillated to swing said second jaw toward said fixed jaw and also to be caused to bind on said shank.

It is more specifically an object of the invention to provide pliers comprising a member having a fixed jaw at one end, a shank extending from said jaw and a handle secured to said shank, a second member embracing said shank, said shank having a series of recesses in one side, a member preferably in the form of a pin secured in said second member and adapted to be disposed in one of said recesses, a spring preferably being provided to hold said pin lightly in one of said recesses so that said second member can be frictionally moved longitudinally of said shank, a second jaw rigidly secured to said second member and adapted to cooperate with said fixed jaw in gripping a member, a handle pivoted to said second member and having a cam portion engaging the opposite side of said shank, said second member being oscillatable on said pin whereby when said handles are moved together said second member will be oscillated on said pin to swing said second jaw toward said fixed jaw and said pin will be caused to bind in one of said recesses to prevent movement of said second member longitudinally of said shank.

These and other objects and advantages of the invention will be fully set forth in the following description made in connection with the accompanying drawings in which like reference characters refer to similar parts throughout the several views and in which:

Fig. 1 is a view in side elevation of said pliers, some parts being broken away, others shown in vertical section and some parts being shown in different positions in dotted lines;

Fig. 2 is a top plan view;

Fig. 3 is a view in end elevation as seen from the right of Fig. 1;

Fig. 4 is an end elevation as seen from the left of Fig. 1; and

Fig. 5 is a vertical section taken on line 4—4 of Fig. 1, as indicated by the arrows.

Referring to the drawings, a pair of pliers is shown comprising a member 10 having a fixed jaw 10a formed at one end thereof. While jaw 10a could be variously formed, it is shown as extending at an angle to member 10 and having a face provided with corrugations 10b. Member 10 has a shank 10c extending therefrom and a handle 10d is secured to said shank. While said handle could take various forms and be variously secured, in the embodiment of the invention it is shown as comprising portions 10f secured to opposite sides of said shank by screws or rivets 11. A member 12, shown as in the form of a yoke, is disposed on and embraces shank 10c. Member 12 may conveniently be formed as a plate bent into substantial U-shape and thus having parallel side portions and these are disposed at opposite sides of shank 10c in substantial engagement therewith while the bight portion of member 12 is disposed over the top of said shank, as seen in Fig. 1. Shank 10c at said top side has formed therein a series of recesses or depressions 10e and a member 13 preferably in the form of a cylindrical pin extends between the sides of member 12 and is adapted to seat in one of the recesses 10e. Member 13 is secured in member 12 and while this could be done in various ways, in the embodiment of the invention illustrated it is shown as having its ends riveted in the sides of member 12. A spring 14 formed of narrow plates extends longitudinally of shank 10c, the same being largely disposed within member 12 and engaging the top portion thereof, said spring having ends bent over the pin 13. Spring 14 extends without member 12 and has one side engaging the side of shank 10c having the depressions 10e therein, said end being bent slightly upward. Below shank 10c member 12 has rigidly secured thereto a second jaw 15. While jaw 15 could be secured in various ways, it is illustrated as secured to member 12 by spaced rivets 16. Jaw 15 is arranged to oppose and cooperate with jaw 10a and has a face 15a provided with corrugations and adapted to cooperate with the face 10b in gripping an object. A handle 18 is pivoted adjacent the rear end of member 12 on a pin 19 extending between the sides of member 12 which is also preferably riveted in member 12. Handle 18 has a cam portion 18a engaging the side of shank 10c opposite that having the recesses 10e therein. Handle 18 extends toward the rear end of the pliers and is adapted to be grasped with handle 10d in the operation of the pliers. A pin 20 is disposed in shank 10c adjacent handle 10d and projects at either side of said shank to form a stop limiting the movement of member 12.

With the described construction, member 12 can be frictionally moved longitudinally of shank 10c with jaw 15 and handle 18 as spring 14 holds pin 13 lightly in engagement with shank 10c and in one of the recesses 10e. When an object such as a rod 22 is to be grasped, face 10b will be placed thereagainst and member 12 will then be moved longitudinally of shank 10c to bring face 15a into engagement with rod 22. The handle 18 is now swung toward handle 10d and said handles grasped in one hand of the operator. Member 12 is oscillatable on pin 13 and the cam portion 18a now moves on shank 10c and acts to swing member 12 about pin 13, thus swinging jaw 15 toward jaw 10a. Great leverage is brought to bear in this movement so that jaw 15 can be moved with great pressure against object 22 so that the latter will be very tightly gripped and prevented from any motion in said jaws. At the same time cam portion 18a causes the bight portion of member 12 to move toward the shank 10c and this causes pin 13 to bind in one of the recesses 10e so that any movement of member 12 longitudinally of shank 10c is prevented. By moving the handles toward each other therefore member 12 is held from longitudinal movement of shank 10c and jaw 15 is swung with great force toward jaw 10a to grip the object to be engaged.

From the above description it will be seen that I have provided a simple and yet highly efficient structure of pliers, by means of which an object can be firmly grasped and great pressure exerted upon the jaws of the pliers to grasp said object so that it cannot move or turn in said jaws. The parts of the device are comparatively few and of simple construction and the device can be easily assembled. The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A cam operated pliers having in combination, a member having a fixed jaw at one end, said jaw having a gripping face, a shank extending from said jaw and having a handle at the other end of said member, said jaw extending forwardly and said face being disposed at an obtuse angle to said shank, a slidable carriage on said shank comprising a U-shaped plate substantially rectangular in side elevation and having its bight portion disposed over the top of said shank and its sides extending in close proximity to and substantially parallel to the sides of said shank, said shank having a plurality of recesses extending transversely thereof in its top side, a pin secured in and extending between the sides of said carriage above said shank and adapted to seat in any one of said recesses, a second jaw rigidly secured to said carriage adjacent the end thereof which is adjacent said first mentioned jaw, said second jaw extending forwardly and having a face making a slight angle with said first mentioned face, a second handle pivoted to said carriage below said shank and adjacent the end of said carriage remote from said jaws, said handle having a cam formed thereon adjacent said pivot and engageable with the bottom side of said shank, and resilient means disposed in the bight shank, and resilient means disposed in the bight portion of said carriage engaging said pin, said carriage and said shank to hold said shank or carriage in its upper position and said cam in engagement with said shank whereby when said handles are moved together said carriage is rocked about the axis of said pin to move its lower side toward said first mentioned jaw and grip an article between said faces and hold said carriage in a stationary position.

2. A cam operated pliers having in combination, a member having a fixed jaw at one end, a shaft extending from said jaw and having a handle at the other end of said member, said jaw extending forwardly and having a face disposed at an angle substantially greater than 90 degrees relative to said shank, a slidable carriage on said shank formed by a U-shaped plate rectangular in side elevation and of considerable length and having its bight portion extending over the top of said shank with its sides substantially parallel to the sides of said shank, said shank having a plurality of transversely extending recesses in its top side, a pin secured in and extending transversely between the sides of said carriage adjacent the bight portion thereof and being adapted to seat in any one of said recesses, a second jaw fixedly secured to said carriage adjacent its lower end and the end adjacent said first mentioned jaw and having a face making a slight angle to said first mentioned face, a second handle pivoted to said carriage adjacent the bottom thereof and adjacent the end thereof remote from said first mentioned jaw, said second handle having a cam adjacent its pivot engageable with the bottom side of said shank whereby when said handles are moved together said carriage is rocked about the axis of said pin to swing said second jaw toward said first mentioned jaw and said carriage is held stationary with the work clamped between said jaw faces, and a plate spring disposed between the top side of said shank and said bight in said carriage and having one end extending over said pin, said spring engaging the top of said bight intermediate the ends of said spring and engaging the top of said shank at its other end.

OSCAR V. MALMQUIST.

REFERENCES CITED

The following references are of record in the file of this patent:

UNITED STATES PATENTS

| Number | Name | Date |
|---|---|---|
| 627,401 | Edwards | June 20, 1899 |
| 656,622 | Barnes | Aug. 28, 1900 |
| 747,261 | Sterne | Dec. 15, 1903 |
| 1,147,340 | Petterson | July 20, 1915 |
| 1,269,275 | Grogan | June 11, 1918 |
| 1,709,378 | Sulger | Apr. 16, 1929 |
| 2,409,627 | Helgeson | Oct. 22, 1946 |